July 7, 1970            H. H. DUDLEY            3,519,341
BATTERY POWERED MOTION PICTURE CAMERA HAVING A PISTOL
GRIP HANDLE PIVOTABLY SUPPORTED ON THE CAMERA HOUSING
Filed April 29, 1968            4 Sheets-Sheet 1
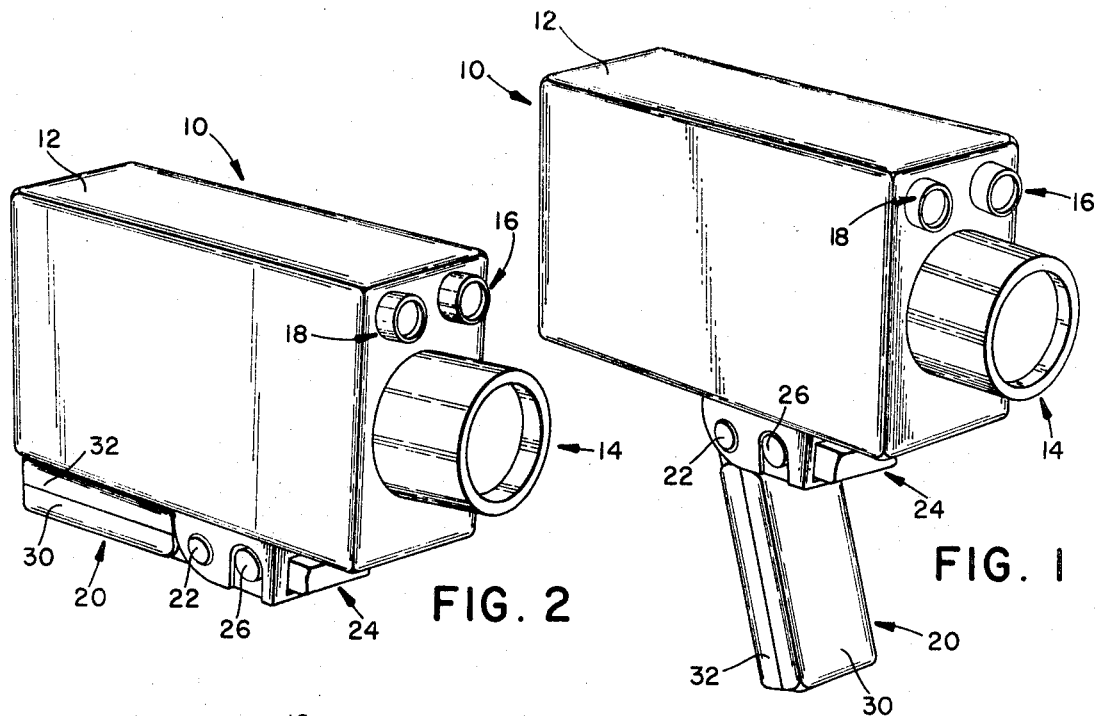
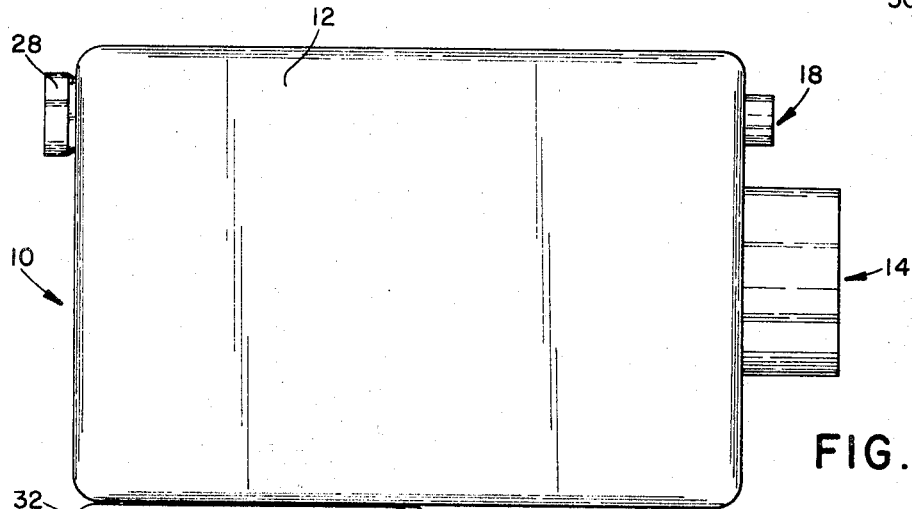
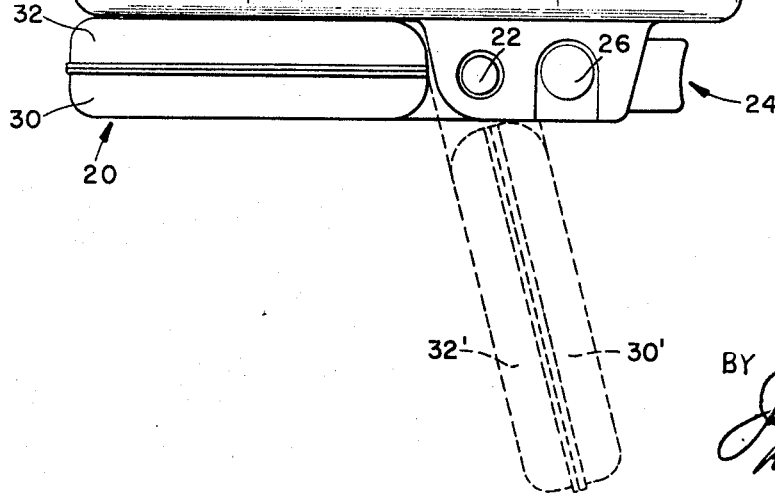
HARVEY H. DUDLEY
INVENTOR.
BY
*James J. Wood*
*Robert W. Hampton*
ATTORNEYS July 7, 1970  H. H. DUDLEY  3,519,341
BATTERY POWERED MOTION PICTURE CAMERA HAVING A PISTOL
GRIP HANDLE PIVOTABLY SUPPORTED ON THE CAMERA HOUSING
Filed April 29, 1968  4 Sheets-Sheet 2

HARVEY H. DUDLEY
INVENTOR.

BY
James J. Wood
Robert W. Hampton

July 7, 1970  H. H. DUDLEY  3,519,341
BATTERY POWERED MOTION PICTURE CAMERA HAVING A PISTOL
GRIP HANDLE PIVOTABLY SUPPORTED ON THE CAMERA HOUSING
Filed April 29, 1968  4 Sheets-Sheet 3

HARVEY H. DUDLEY
INVENTOR.
BY
James J. Wood
Robert W. Hampton

ATTORNEYS

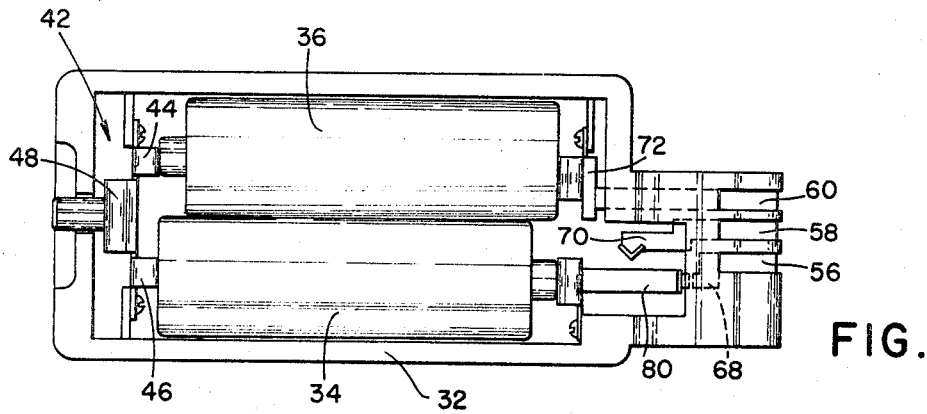
FIG. 10
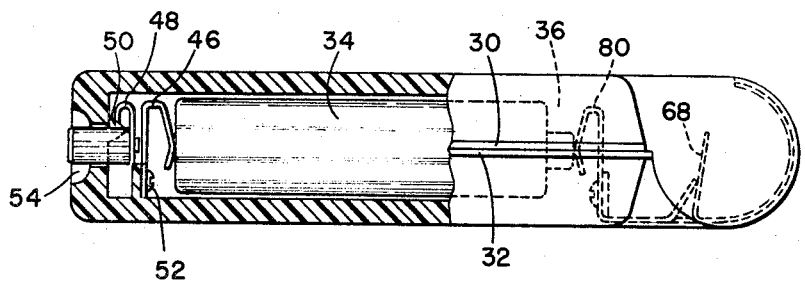
FIG. 11
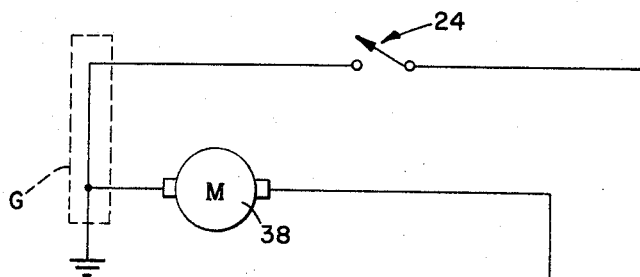
FIG. 12
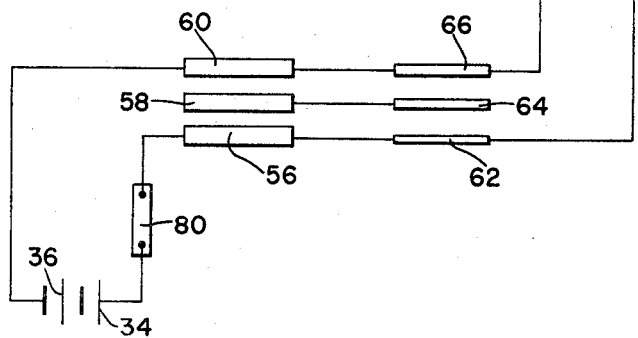
HARVEY H. DUDLEY
INVENTOR.
BY James J Wood
Robert W Hampton
ATTORNEYS

United States Patent Office 3,519,341
Patented July 7, 1970

3,519,341
BATTERY POWERED MOTION PICTURE CAMERA HAVING A PISTOL GRIP HANDLE PIVOTABLY SUPPORTED ON THE CAMERA HOUSING
Harvey H. Dudley, Rochester, N.Y., assignor to Eastman Kodak Company, Rochester, N.Y., a corporation of New Jersey
Filed Apr. 29, 1968, Ser. No. 725,024
Int. Cl. G03b 19/18
U.S. Cl. 352—95          5 Claims

ABSTRACT OF THE DISCLOSURE

A battery powered motion picture camera has a pistol grip handle pivotably supported on the camera housing. Energy storage cells are mounted within the handle. A plurality of conductors are wrapped around portions of the handle, and they fit within the recess of the camera handle to connect with the cells. A plurality of complementary conductors on the camera engage the conductors on the handle. In this manner, the power from the handle can be used to power the camera when the handle is in different positions.

CROSS-REFERENCE TO RELATED APPLICATION

Reference is made to commonly assigned copending U.S. patent application Ser. No. 678,982, entitled Handle and Battery Compartment for Photographic Apparatus, filed in the name of Walter E. Taylor on Oct. 30, 1967, and now U.S. Pat. No. 3,508,482.

BACKGROUND OF THE INVENTION

The invention relates to a motion picture camera having a pistol grip handle, pivotably supported on the camera housing. The pistol grip contains the storage cells, which, together with cooperating electrical connectors, provide a means for energizing a number of sub-systems, in accordance with camera functional requirements.

SUMMARY OF THE INVENTION

The instant invention relates to a battery powered motion picture camera, having a pistol grip handle, pivotably supported on the camera housing, the camera being provided with a plurality of electrical conductors, which enable the energy cell sources within the pistol grip handle to be connected in order to satisfy the camera requirements.

The novel features which are believed to be characteristic of the invention are set forth with particularity in the appended claims. The invention itself, however, both as to its organization and method of operation, together with objects and advantages thereof, may best be understood by reference to the following description, considered in connection with the accompanying drawings.

BRIEF DESCRIPTION OF THE DRAWINGS

FIG. 1 is a pictorial view showing the pistol grip handle in extended fashion, ready for picture taking;
FIG. 2 is a pictorial view showing the pistol grip handle in folded position;
FIG. 3 is a side elevational view depicting additional details of the camera, and showing the pistol grip handle in phantom section in extended position.

FIG. 10 is a pictorial view, viewed from the top of one half section member of the pistol handle grip, showing the cells suitably arranged in a second embodiment;
FIG. 11 is a front elevational view partly in section, showing the mating half section members forming the pistol grip in the second embodiment;
and
FIG. 12 is an electric schematic showing the utilization of the pistol grip handle in the second embodiment.

DESCRIPTION OF THE ILLUSTRATED EMBODIMENTS

Figure 4:
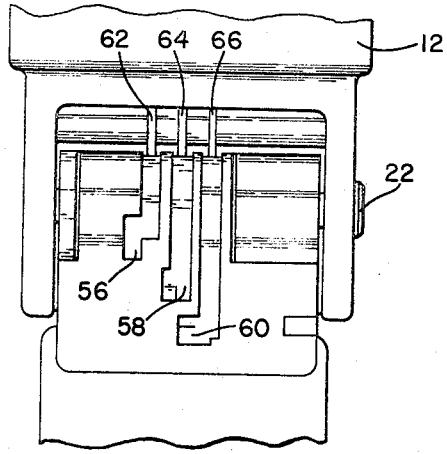
FIG. 4 is a partial pictorial view showing the pistol grip handle with its conductor elements engaging complementary radial conductors on the camera housing.
Figure 5:
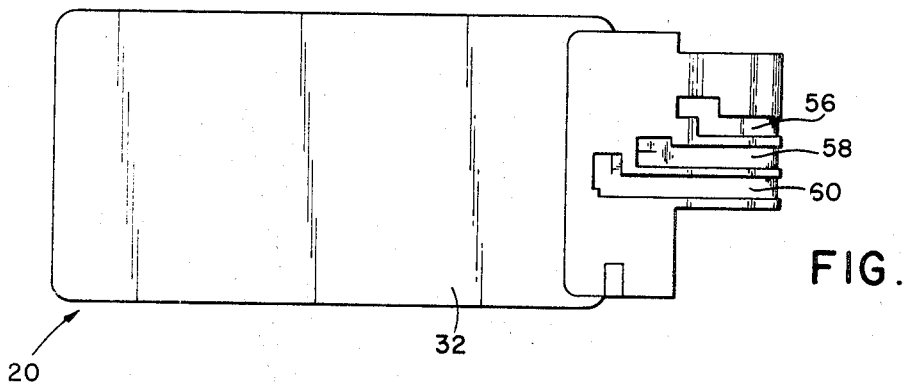
FIG. 5 is a bottom view of one of the half section members, forming the pistol hand grip, and showing the conductor elements on this member.

The overall appearance of the battery powered motion picture camera embodying the instant invention, may be appreciated by reference to FIGS. 1, 2, and 3. The motion picture camera, indicated generally at 10, has a wall casing 12 of plastic material; mounted thereon in operable fashion is a zoom lens indicated generally at 14. On the forward end of the camera, there is also located a viewfinder indicated generally at 16, and an automatic exposure control indicated generally at 18.

The pistol grip handle and battery compartment of this invention is indicated generally at 20; it is rotatably mounted on a shaft 22 secured to the casing 12. A camera trigger is indicated generally at 24, while a post 26 provides a means for securing a camera strap or handle, not illustrated in the drawing. The camera eyepiece is indicated generally at 28 (FIG. 3).

The camera 10 is shown in one operating position in FIG. 1, and also in the view of FIG. 3, where the handle member 20 is depicted in extended position in phantom section. The subject to be photographed is viewed through the eyepiece 28 and the viewfinder 16, the automatic exposure control 18 automatically providing the proper aperture. When all is in readiness, the operator squeezes the trigger 24, to set the film transport mechanism in operation.

The pistol grip handle and battery compartment 20 comprises two mating half section members 30, 32, which are conveniently arranged to be opened for the insertion of two dry cells and one mercury cell.

The instant invention is illustrated in two embodiments. In the preferred embodiment, as shown in FIGS. 1 through 9, the battery operated movie camera includes an automatic exposure control system 18. In an alternative embodiment, as exemplified in FIGS. 10 through 12, the pistol grip handle 20 is adapted for utilization in cameras which do not have an automatic exposure control.

THE PREFERRED EMBODIMENT

Figure 6:
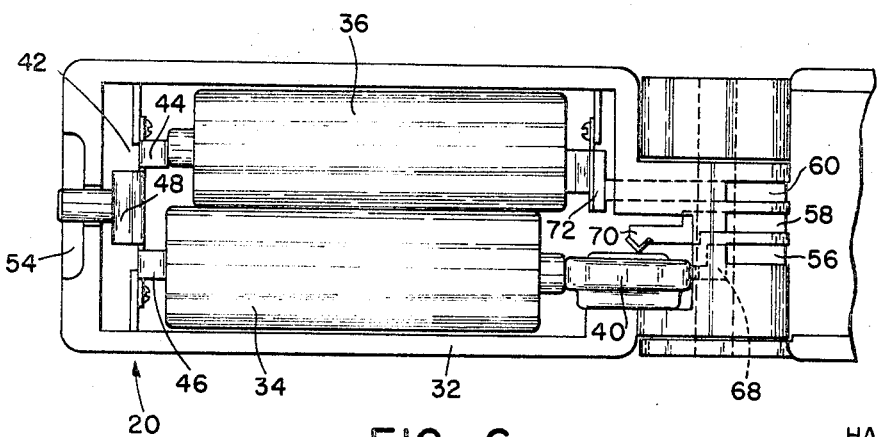
FIG. 6 is a top plan view of the same half sectional member, showing the dry cells in position.
Figure 9:
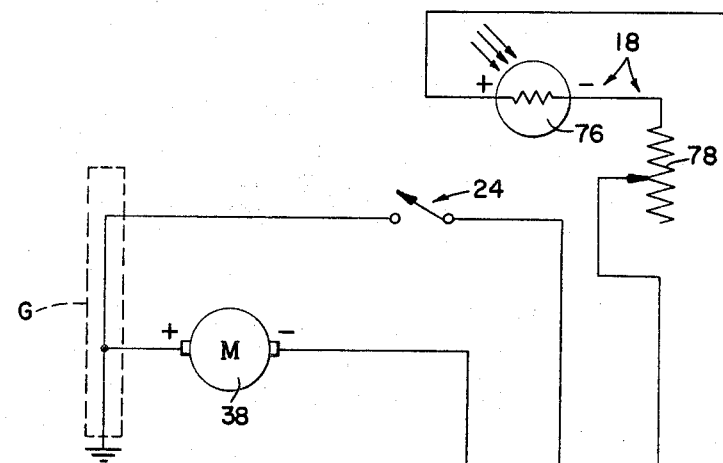
FIG. 9 is an electric schematic of one embodiment of the invention, wherein the battery is used to supply energy for the electric motor.

Referring now in general to FIGS. 4 through 9, wherein the handle and battery compartment is shown in various aspects, as best shown in FIG. 6, the handle and battery compartment is intended to contain two AA dry cells, 34, 36, for supplying energy for the camera motor 38 (FIG. 9) and one mercury cell 40 for supplying energy to the automatic exposure control system 18 (FIG. 9).

Figure 7:
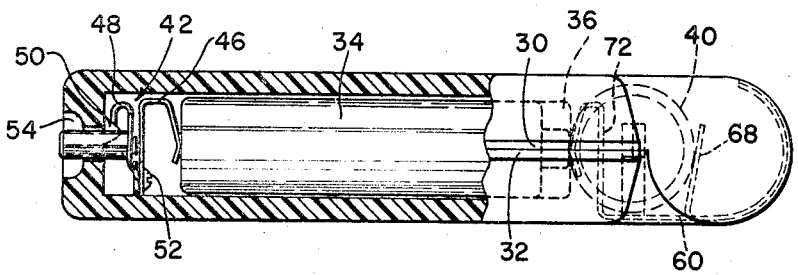
FIG. 7 is a partial sectional view showing the half section members forming the pistol grip, and illustrating in particular the electrical connections and the latching means.
Figure 8:
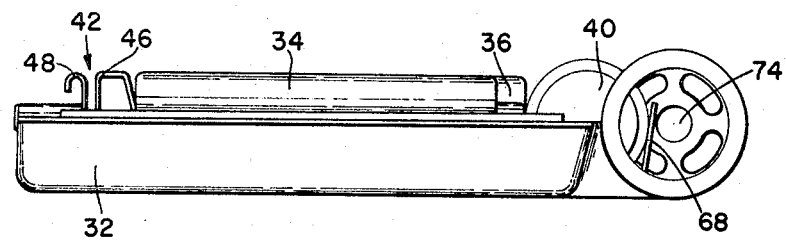
FIG. 8 is a pictorial view showing the same half sectional member shown in FIG. 5, the top half section member being removed in the interest of clarity.

The dry cells 34, 36 are connected electrically in series by means of a contact member indicated generally at 42 (FIG. 6). The functional responsibilities for contact member 42 may best be understood by specific reference to FIGS. 6, 7 and 8. Contact member 42 includes two prong-like members or extensions 44, 46 (FIG. 6) which are bent in a fashion to provide snapping or spring-like contact with the plus and minus terminals of dry cells 36 and 34, respectively. Contact member 42 further includes a hook-like extension 48, which, as best shown in FIG. 7, provides a spring latching means for engaging a protuberance 50 on the compartment half section member 30 to bring the two sections 30, 32 in locking arrangement. Contact member 42, comprising the parts identified as 44, 46, 48, may be conveniently made in one piece, pressed into a suitably molded part of half section 32, or it may be fastened by means of a screw 52 (FIG. 7) secured through a molded portion of the half section member 32. As best shown in FIG. 7, the two half sections 30, 32, in closed relationship, are provided with an opening at 54 to enable finger insertion to open the half sections for the purpose of inserting the dry cells.

At the hinged end, the handle-battery compartment 20 is provided with three conductive members 56, 58, 60. As may be seen from a study of FIGS. 5 and 6, considered together, the conductive members 56, 58, 60 wrap around the end of the pistol grip handle.

The camera body 12 is provided with complementary radial contacts 62, 64, 66 which provide continuous contact with the conductive members 56, 58, 60, respectively on the handle. The role of the radial conductors 62, 64, 66 in the overall circuit arrangement will be considered at a later time.

Referring back now in particular to FIG. 6, the positive terminal or the case (+ polarity) of the mercury cell 40 is fitted within the pistol grip handle so as to be contiguous with the positive terminal of the dry cell 34. The conductive member 56 includes a spring-like extension member 68 (FIGS. 7 and 8) which extends within the interior of the handle 20, making contact with the positive case of the cell 40. The radial conductor 62 is connected to one side of the trigger switch 24 (FIG. 9); the other side of the switch 24 is connected to any convenient metallic conductor G within the camera, selected to be common or ground for the electrical circuitry. For example, the metallic bed plate of motor 38 may be selected to be at ground (G). It will thus be noted at this point that the positive terminals of the cells 34 and 40 are contiguous.

A spring point contact 70 (FIG. 6) is arranged to make electrical contact with the negative terminal of the mercury cell 40, the point contact 70 being integral with conductive member 58. The terminal conductor 60 includes a spring-like extension 72 (FIGS. 6, 7) which is in contiguous relationship with the negative terminal of dry cell 36. The half section member 32 is suitably apertured at 74 to receive the supporting shaft post 22.

Referring now to FIG. 9 to complete the description of this embodiment, the exposure control system 18 comprises in part a photocell 76 and a rheostat 78. As shown in FIG. 9, the photocell is connected at one end to the conductive member 62, and the other end of the photocell is connected to the rheostat 78, the variable tap of the rheostat being connected to the radial conductor 64.

Referring now to FIG. 9, the operation of the movie camera will now be considered. As may be seen in FIG. 9, the open trigger switch 24 keeps the motor 38 in an unenergized state—while the negative terminal of the motor 38 may be traced through contacts 66, 60 to the negative terminal of the cell 36, the positive terminal of the motor 38 is not connected to the energizing source 34, 36 by reason of the open position of the switch 24. As will be observed from a study of FIG. 9, the automatic exposure control system 18 is continuously energized by the mercury cell 40. Obviously, then, the closing of the switch 24 electrically completes the circuit for energizing the motor 38, while the automatic exposure control system 18 is continuously energized.

AN ALTERNATIVE EMBODIMENT

In some applications, the automatic exposure control system 18 may not be a part of the movie camera and hence, the mercury cell 40 is not required. Referring to FIGS. 10, 11, and 12, the same pistol grip handle 20 may still be used by replacing the mercury cell by a spring contact member 80 for electrically bridging the gap left vacant by the removal of the mercury cell and completing the circuit from the dry cell 34 to the extension 68 of the terminal 56.

As may be seen from a study of FIG. 12, in this particular application, the contacts 58 and 64 are not utilized. Again, as in the previous embodiment, the motor circuit remains electrically open until the closing of the switch 24.

The invention has been described in detail with particular reference to the illustrated preferred and alternative embodiments thereof, but it will be understood that variations and modifications can be effected within the spirit and scope of the invention.

I claim:
1. In a motion picture camera having a housing and a pistol grip handle pivotably supported on the housing, and including an electric motor for driving a camera mechanism, the motor having first and second terminals and being energizable by a plurality of electrical cells, the combination comprising:
 (a) a pair of mating section members together defining the handle and being internally adapted to provide a recess for receiving the plurality of electrical cells;
 (b) a plurality of conductive members on one of said section members and adapted to enter into said recess to electrically connect with the cells to provide one terminal of one polarity and at least one other terminal of opposite polarity;
 (c) a plurality of complementary conductors on the housing and adapted for continuous engagement with said plurality of conductive members, respectively, providing electrical continuity into the housing for said one terminal of one polarity and said at least one other terminal of opposite polarity, one of said at least one other terminal of opposite polarity being connected to the first terminal on the motor; and
 (d) switching means connected between said one terminal of one polarity and the second terminal on the motor.

2. In a motion picture camera having a housing and a pistol grip handle pivotably supported on the housing, and including an electric motor for driving a camera mechanism, the motor having first and second terminals and being energizable by a pair of electrical cells, the combination comprising:
 (a) a first section member having a protuberance;
 (b) a second section member cooperating with said first section member to define the handle, said first and second section members being adapted to provide a recess for receiving the pair of electrical cells;
 (c) latching means on said second section member and adapted to engage said protuberance in latching relationship;
 (d) a plurality of conductive members on said second section member and adapted to enter into said recess to electrically connect with the cells to provide one terminal of one polarity and another terminal of opposite polarity;
 (e) a plurality of complementary conductors on the housing and adapted for continuous engagement with said plurality of conductive members, respectively, providing electrical continuity into the housing for said one terminal of one polarity and said other terminal of opposite polarity, said other terminal of opposite polarity being connected to the first terminal on the motor; and
 (f) switching means connected between said one terminal of one polarity and the second terminal on the motor.

3. In a motion picture camera having a housing and a pistol grip handle pivotably supported on the housing, and including an electric motor having first and second terminals and an exposure control circuit having first and second connecting portions, the motor being energizable by a pair of dry cells and the exposure control circuit being energizable by a mercury cell, each cell having an electrode of one polarity and an electrode of opposite polarity, the combination comprising:

(a) a first section member having a protuberance;
(b) a second section member cooperating with said first section member to define the handle, said first and second section members being adapted to provide a recess for receiving the pair of dry cells and the mercury cell, the electrodes of said one polarity on one of the dry cells and the mercury cell defining a common connection;
(c) a bifurcated spring member on said second section member and adapted to engage the electrode of said opposite polarity on the one dry cell and the electrode of said one polarity on the other dry cell in series relationship;
(d) latching means on said second section member and adapted to engage said protuberance in latching relationship;
(e) three conductive members wrapped around a portion of said second section member and adapted to enter into said recess, two of said conductive members being adapted to connect, respectively, with the electrodes of said opposite polarity on the other dry cell and the mercury cell to provide two terminals of said opposite polarity, the third of said conductive members being electrically continuous with said common connection;
(f) three complementary conductors on the housing and adapted for continuous engagement with said three conductive members, respectively, providing electrical continuity into the housing for said two terminals of said opposite polarity and said common connection, said two terminals of said opposite polarity being connected, respectively, to the first terminal of the motor and to the first connecting portion of the exposure control circuit, said common connection being connected to the second connecting portion of the exposure control circuit, the circuit thereby being continuously energized; and
(g) switching means connected between said common connection and the second terminal of the motor.

4. In a motion picture camera having a housing and a pistol grip handle pivotably supported on the housing and including an electric motor having first and second terminals and an exposure control circuit having first and second connecting portions, the motor being energizable by first and second electrical cells, the exposure control circuit being energizable by a third electrical cell, each cell having an electrode of one polarity and an electrode of opposite polarity, the combination comprising:

(a) a first section member having a protuberance;
(b) a second section member cooperating with said first section member to define the handle, said first and second section members providing a recess adapted to receive the first, second, and third electrical cells, the electrodes of said one polarity on the second and third electrical cells being connected to define a common connection;
(c) a bifurcated spring member on said second section member and adapted to engage the electrode of said opposite polarity on the second electrical cell and the electrode of said one polarity on the first electrical cell in series aiding relationship;
(d) three conductive members wrapped around a portion of said second section member and adapted to enter into said recess, two of said conductive members being adapted to connect, respectively, with the electrodes of said opposite polarity on the first and third electrical cells to provide two terminals of said opposite polarity, the third of said conductive members being electrically continuous with said common connection;
(e) three complementary conductors on the housing and adapted for continuous engagement with said three conductive members, respectively, providing electrical continuity into the housing for said two terminals of said opposite polarity and said common connection, said two terminals of said opposite polarity being connected, respectively, to the first terminal of the motor and to the first connecting portion of the exposure control circuit, said common connection being connected to the second connecting portion of the exposure control circuit, the circuit thereby being continuously energized; and
(f) switching means connected between said common connection and the second terminal of the motor.

5. The combination claimed in claim 4 further comprising
latching means on said second section member and adapted to engage said protuberance in latching relationship.

References Cited
UNITED STATES PATENTS

| | | | |
|---|---|---|---|
| 3,437,029 | 4/1969 | Rydstedt | 95—86 |
| 3,242,840 | 3/1966 | Kremp et al. | |

FOREIGN PATENTS 1,448,801  3/1965  France.

NORTON ANSHER, Primary Examiner
M. D. HARRIS, Assistant Examiner

U.S. Cl. X.R.
95—86; 352—243